United States Patent

Gesior

[15] 3,662,922

[45] May 16, 1972

[54] GRANULAR CHEMICAL APPLICATOR WITH SLIDABLE METERING MEANS

[72] Inventor: Augustyn M. Gesior, Clarendon Hills, Ill.
[73] Assignee: International Harvester Company, Chicago, Ill.
[22] Filed: June 19, 1970
[21] Appl. No.: 47,856

[52] U.S. Cl. .................................. 222/46, 222/177, 222/561
[51] Int. Cl. ........................................................... B67d 5/22
[58] Field of Search ............... 251/205; 222/23, 41, 46, 49, 222/50, 176, 177, 561, 486, 309, 561

[56] References Cited

UNITED STATES PATENTS

| | | | |
|---|---|---|---|
| 2,715,482 | 8/1955 | Juzwiak | 222/177 |
| 3,468,457 | 9/1969 | Martin | 222/561 X |
| 2,728,493 | 12/1955 | Spurgeon | 222/41 X |
| 1,980,049 | 11/1934 | Gainer | 222/561 X |
| 2,717,725 | 9/1955 | Bennett | 222/561 X |
| 2,069,350 | 2/1937 | Blue | 222/561 |
| 2,710,120 | 6/1955 | Thomsen | 222/561 X |
| 3,191,807 | 6/1965 | Rodrigues | 222/49 |

Primary Examiner—Robert B. Reeves
Assistant Examiner—Larry Martin
Attorney—Floyd B. Harman

[57] ABSTRACT

A dispenser including metering mechanism for dispensing granular chemicals and like materials in agricultural operations wherein the dispenser has a concave bottom in which is mounted a vaned wheel for delivering material to a discharge outlet, and a valve is linearly slidable against the bottom and has a metering opening registrable with the outlet for regulating the rate of flow of material therefrom, the valve having an external portion with indicia, and wherein means are provided for adjusting the valve.

1 Claim, 6 Drawing Figures

Patented May 16, 1972

INVENTOR
AUGUSTYN M. GESIOR
BY F. David Au Buchon ATT'Y.

Patented May 16, 1972

INVENTOR
AUGUSTYN M. GESIOR
BY F. David Aue Buelow ATT'Y.

Patented May 16, 1972

INVENTOR
AUGUSTYN M. GESIOR

BY ATT'Y.

3,662,922

1

GRANULAR CHEMICAL APPLICATOR WITH SLIDABLE METERING MEANS

BACKGROUND OF THE INVENTION

This invention relates to material dispensers and particularly to dispensers for granular chemicals and the like. More specifically, the invention concerns metering mechanism for regulating the rate of flow of material.

In apparatus for dispensing dry chemicals such as herbicides, insecticides and the like, one of the problems encountered has been the corrosive action of the chemicals on the dispenser parts with which they come in contact. It has also been thought that the metering mechanism for regulating the rate of discharge must be made of rigid metals to accurately control the flow of material. Furthermore, the metering controls for regulating the flow rate in conventional applicators or dispensers has not been adequately related to the speed of ground travel to discharge the desired amount of chemicals for a given area. Also, the customary vaned feed wheels or cylinders for delivering the material to the discharge outlet have frequently tended to crush the material or allow it to be caught between the edges of the vanes and the wall area adjacent the outlet. This is particularly disadvantageous when the flow of material is stopped while the feed wheel continues to revolve.

An object of the present invention is the provision of a novel dispenser structure for agricultural material.

Another object of the invention is the provision of improved metering mechanism for a material dispenser.

Another object of the invention is the provision, in a dispenser for dry chemicals and the like, of improved means substantially immune to chemical attack for controlling the flow of material from the dispenser.

A further object of the invention is to provide an improved dispenser housing for a chemical applicator comprising an upper receptacle or hopper portion and a lower metering portion wherein the valve means for metering the flow rate of the chemical is enclosed within the housing and therefore free of contamination by foreign matter, while the controls for the valve means are disposed outside of the housing.

DESCRIPTION OF THE DRAWINGS

FIG. 6 is an enlarged perspective view of a portion of the valve structure shown in FIG. 3.

DESCRIPTION OF THE PREFERRED EMBODIMENT

Figure 1:
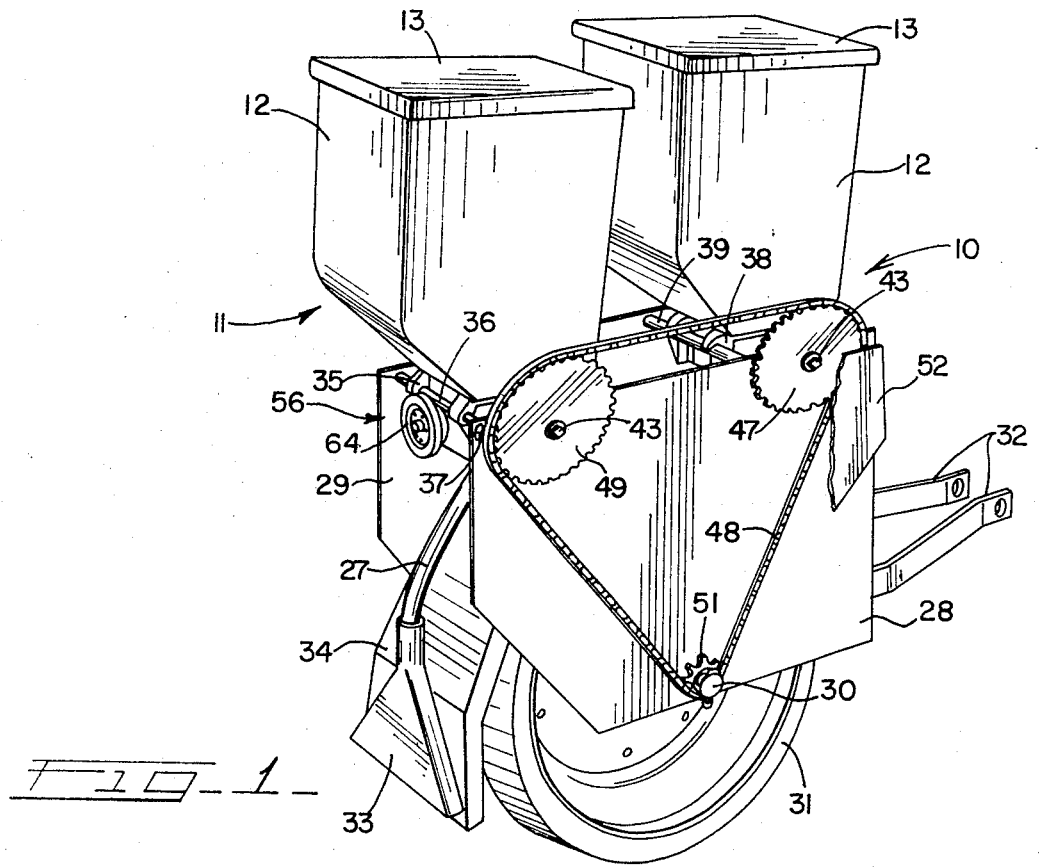
FIG. 1 is a perspective view, with parts broken away, of an implement including a pair of dispensers incorporating the features of this invention for dispensing dry chemicals and adapted for connection to a tractive vehicle.
Figure 2:
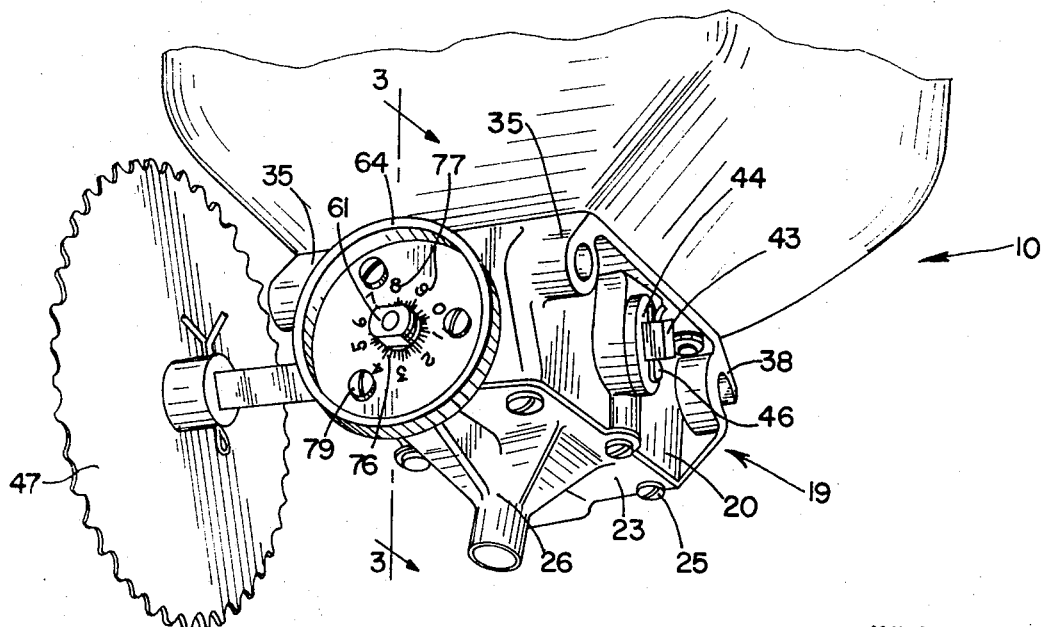
FIG. 2 is an enlarged detail perspective, with parts removed, of a portion of one of the dispensers shown in FIG. 1.
Figure 3:
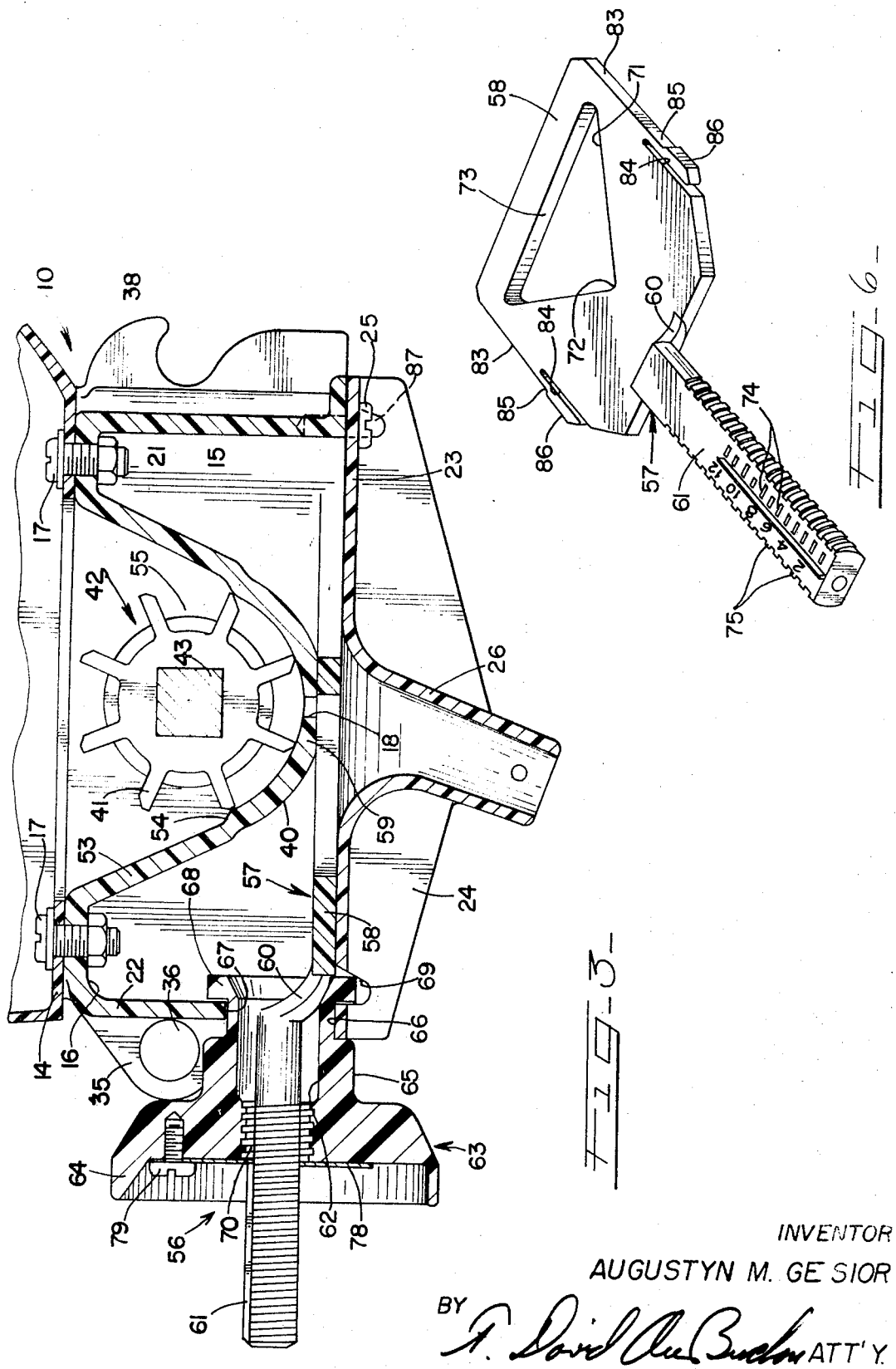
FIG. 3 is a sectional view taken approximately on the line 3—3 of FIG. 2.
Figure 4:
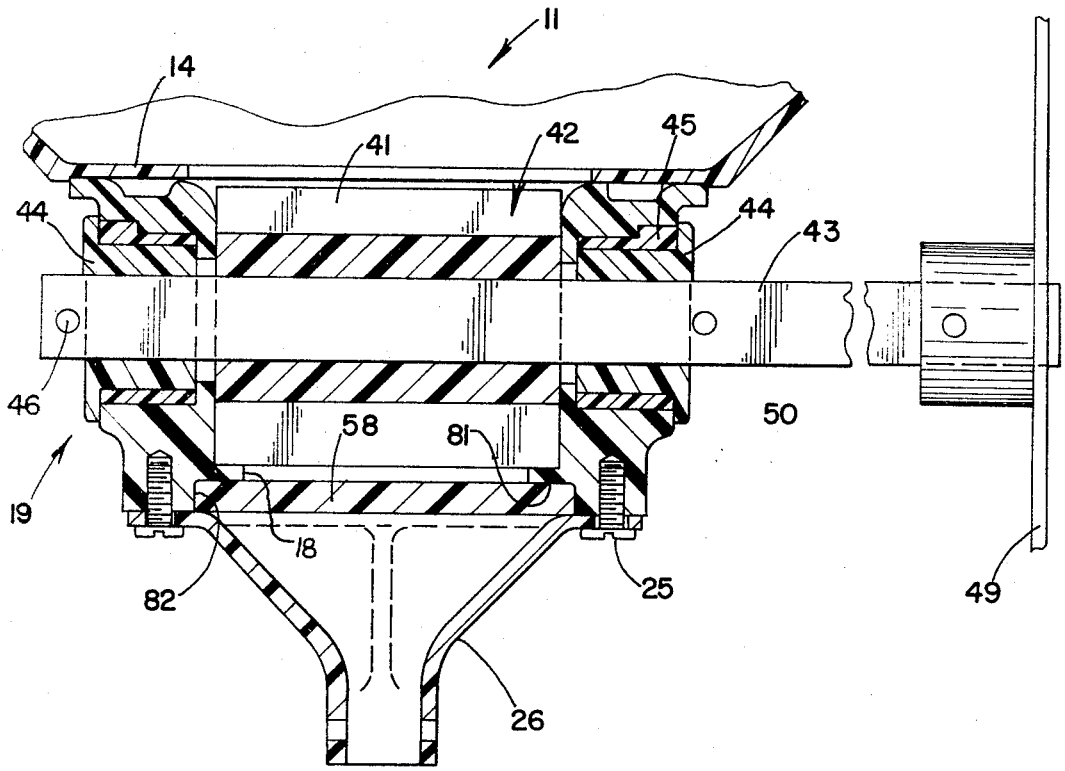
FIG. 4 is another sectional view taken approximately on the line 4—4 of FIG. 1.
Figure 5:
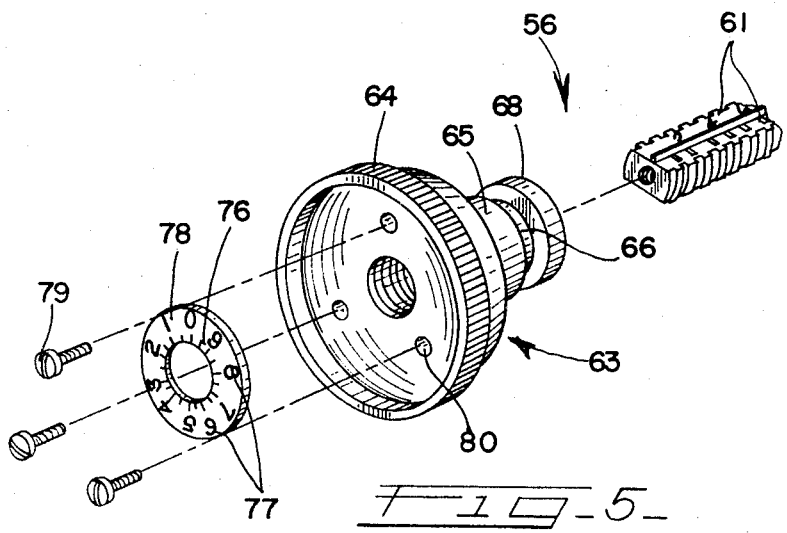
FIG. 5 is an exploded view of a portion of the valve control mechanism of the invention.

FIG. 1 shows an implement designed for the application to the soil of granular chemicals and comprises a pair of front and rear dispenser housing units 10 and 11, the enlarged view of FIG. 2 and the section of FIG. 3 detailing the lower portion of the forward dispenser unit 10 and FIG. 4 representing a vertical sectional view through the lower portion of the rear unit 11. The two dispenser units are substantial duplicates so that like parts thereof are designated by like numerals, and one of the dispensers may contain a herbicide while the other contains an insecticide.

The open top hopper or receptacle portions 12 of the dispenser housings are provided with lids 13 and the lower portions of the side walls thereof are inclined inwardly, and an inwardly directed flange 14, as shown in FIGS. 3 and 4, has affixed thereto a concave bottom member 15 having a flange 16 removably secured to flange 15 by bolts 17.

2

Hopper bottom member 15 is arcuately shaped with its upper edges coincident with the inner edges of flange 14 so that material in the hopper portion fills the concave bottom, the latter being provided with a transversely elongated discharge outlet 18. The concave bottom and flange form part of a generally rectangular auxiliary metering enclosure generally designated at 19 and including side walls 20 and end walls 21 and 22, and to which a base plate 23 having strengthening ribs 24 is secured by bolts 25. The entire dispenser housing structures 10 and 11 including hoppers 12 and enclosures 23 are made of plastic material resistant to the corrosive action of the granular chemicals, the hopper portions being preferably made of fiber glass, and base plate 23 includes an angularly directed funnel portion 26 in registry with outlet 18 and to which is connected a flexible guide tube 27, shown in FIG. 1.

Dispensers 10 and 11 are mounted between a pair of frame plates 28 and 29 the lower ends of which rotatably support the ends of an axle 30 on which is mounted a ground engaging wheel 31. A pair of drag links 32 are affixed to the plates 28 and 29 and are adapted for connection to a tractor or to the tool bar, not shown, of an implement such as a planter, it being understood that a plurality of applicators may be mounted in transverse alignment on such a tool bar and suitable means may be provided for moving the units to transport position.

Granular chemicals discharged from the dispenser and passing through guide tube 27 enter a triangularly shaped spreader 33 of any well known type anchored to a plate 34 secured to and extending downwardly and rearwardly from frame plates 28 and 29, as shown in FIG. 1, it being understood that a similar guide tube and spreader, not shown, are provided for the forward dispenser assembly 10. Each of the dispensers 10 and 11 is removably mounted on plates 28 and 29 by the provision on wall 22 of the auxiliary enclosure 19 of a pair of ears 35 apertured to receive a pivot rod 36 the ends of which are received in openings provided in plates 28 and 29, the rod 36 being readily removable by withdrawing it endwise from the side plates, cotter pins 37 or the like, as indicated in FIG. 1, being provided to lock the rod in place.

For reasons that will become clear hereinafter, enclosure 19 for the forward dispenser 10 is reversed with respect to the enclosure 19 for the rear dispenser 11, and a similar pivot rod 36 is carried in the forward ends of plates 28 and 29. The end wall 21 of each enclosure 19 opposite ears 35 has formed integrally therewith a pair of spaced hooks 38 adapted to engage a bar 39, indicated in FIG. 1 for forward unit 10, the ends of which are carried by plates 28 and 29. The dispenser units 10 and 11 are thus pivotable about the axes of rods 37 to facilitate assembly.

As shown clearly in FIG. 3, the lower portion 40 of the concave hopper bottom member 15 is semicylindrical to provide an inner surface concentric with the cylindrical path defined by the outer edges of a plurality of relatively flexible vanes 41 forming part of and projecting radially from a cylindrical feed wheel 42, of plastic material having an axial bore to receive a drive shaft 43, square in cross-section, rotatable in bearings 44 mounted in bushings 45 carried by the auxiliary enclosure 19, and one end of the shaft is apertured to receive a retaining cotter 46. The other end of shaft 43 for forward dispenser 10 has mounted thereon a sprocket wheel 47 connected by a drive chain 48 with another sprocket wheel 49 of the same size as sprocket wheel 47 mounted on shaft 43 for rear dispenser 11. Another cotter 50 in the shaft at the side of enclosure 19 opposite cotter 46 prevents axial displacement of the shaft. Chain 48 is also trained around a smaller sprocket wheel 51 secured to axle 30 for driving both shafts 43 from ground wheel 31. Sprocket wheels 47 and 49 are mounted on the shafts 43 outside of plate 28 and are covered along with chain 48 by a protective plate, a portion of which is indicated at 52 in FIG. 1.

As will be clear from FIG. 3, the semicylindrical portion 40 of concave bottom 15 spans an arc substantially equal to the span of four vanes 41, the outwardly angled upper portion 53 being offset at its juncture 54 with the lower portion 40. Thus, the outer end of at least one vane 41 is at all times during rotation of the feed wheel in substantial engagement with the inner surface of the lower portion 40 at opposite sides of outlet 18 to prevent escape of material through the outlet when the feed wheel is not being revolved, as when the applicator is in its transport position. During rotation of the feed wheel material fills pockets 55 formed between adjacent vanes 41 and is carried around to discharge outlet 18.

Metering of the material at a selected flow rate as it is discharged from outlet 18 is accomplished by the provision of control means 56 comprising a valve member 57 having a generally rectangular flattened gate portion 58 linearly slidable in the housing between and coplanar with the base plate 23 and the flattened outer surface portion 59 of hopper bottom member 15. Gate portion 58 is connected by an upwardly curved neck 60 to an offset stem 61 projecting outwardly of the enclosure 19 through a flared cylindrical bore 62 in a rotatable knob 63 having an enlarged peripherally serrated handle portion 64 and a hub 65 abutting an extension of base plate 23. A reduced portion 66 of the knob is rotatably seated in an opening 67 in wall 22 and the knob is retained against axial displacement by the provision of a flange 68 engageable with the inner surface of wall 22 and having its lower portion received in a recess 69 in base plate 23.

Stem 61 is generally rectangular in section, having flattened upper and lower faces and curved sides threaded to mate with a reduced cylindrical threaded portion 70 of the bore 62, whereby turning the knob advances and retracts gate 58 inside the auxiliary enclosure 19. As shown in FIG. 1, the valve control means 56 for unit 11 faces to the rear, the auxiliary enclosure 19 for unit 10 being reversed and the corresponding valve control means facing forwardly for easy accessibility.

A triangular metering opening 71 is formed in gate portion 58 of the valve for registration with outlet 18 and funnel 26. The apex 72 of the triangular opening 71 is directed toward the valve stem and the broad base portion 73 of the opening substantially coincides with the width of outlet 18 in the concave bottom member 15.

The maximum flow of material from the hopper portion of the dispenser to the ground occurs when the valve is in the position of FIG. 3 with outlet 18 in registry with the widest part of triangular opening 71. Conversely, the least amount of material is discharged when the valve is shifted by rotation of knob 64 until outlet 18 registers with the smallest part of the triangular opening at its apex 72. Further shifting of the valve closes the outlet 18 so that no material is discharged.

Visual control of the position of the valve with respect to outlet 18 is achieved by the provision of graduation marks 74 and numerical indicia 75 on the flat upper surface of stem 61. Similar graduation marks 76 and numerical indicia 77 corresponding to those on stem 61 are provided on an annulus 78 secured to the recessed outer face of knob 64 by bolts 79 seated in threaded openings 80 in the knob. Each graduation on the knob represents a small increment of liner movement and thus provides a precision micrometer type of adjustment for the valve.

The gate portion 58 of the valve is slidable in a channel 81 forming shoulders 82 engageable with opposite sides 83 of the valve. The valve is retained in a selected position by spring means provided by open ended slots 84 forming wings 85 the ends of which are thickened at 86. Engagement of shoulders 82 with the thickened portions 86 causes the wings to yield while exerting pressure laterally against the shoulders to hold the valve in a selected position.

Oversize openings in base plate 23 receiving bolts 25 accommodate adjustment of the base plate relative to knob 64 to eliminate any looseness in the knob. Likewise, in order to optionally direct the angularity of funnel 26 in the opposite direction from that shown in FIG. 3, base plate 23 can be reversed after removal of bolts 25. Flange 68 of knob 64 then seats in a recess 87 provided in the opposite end of the base plate and corresponding to recess 69.

It is believed that the construction and operation of the novel granular chemical applicator of this invention will be clearly understood from the foregoing description. However, it may be observed that among ancillary advantages accruing from the construction shown, the valve control gate with its metering opening is enclosed in the housing structure of the dispenser, and the threaded external portion of the knob and valve stem are self-cleaning. Also, the danger of moisture entering the hopper portions 12 is avoided by providing the mounting bolt holes in the bottom flange 14.

The vaned or fluted feed wheel 42 accurately delivers even quantities of material to the discharge outlet and effectively shuts off the flow of material when the implement is in transport position, the elasticity of the vanes 41 also eliminating the danger of grinding the chemical granules, as occurs in conventional structures. Furthermore, the mounting of the dispenser units by the hooks 38 and rods 36 renders the units quickly and easily removable for emptying the material from the dispensers or cleaning the mechanism.

What is claimed is:

1. A material dispenser for dry granular agricultural chemical material and the like including a housing structure having a concave bottom in which there is an outlet for the gravitational discharge of such material from said housing, a feed device mounted in the housing for the delivery of such material to said outlet, a base mounted on the dispenser below said bottom and having a funnel portion in registry with said outlet to receive material therefrom and direct it for delivery to the ground, a rate control valve comprising a flattened gate portion disposed between said base and said bottom and having a metering opening registrable with said outlet and said funnel, stem means on said gate portion of the valve and projecting therefrom exteriorly of said housing structure, and adjusting means mounted on said housing structure and cooperable with said stem means for effecting linear sliding movement of the gate portion, the effective width of said opening being variable upon linear adjustment of said gate portion to regulate the rate of flow of material to said funnel, said metering opening is triangular with its greatest width substantially coextensive with the width of said outlet in the fully open position of the valve and said gate portion is slidable to fully closed position of the valve, and wherein said stem member is exteriorly threaded and a threaded knob is rotatably mounted on the dispenser housing structure and operatively engageable with said stem to affect linear adjustment of the gate portion of said valve in said housing relative to said outlet, said metering opening is triangular with its greatest width substantially coextensive with the width of said outlet in the fully open position of the valve and said gate portion is slidable to a fully closed position of the valve, said stem member is exteriorly threaded and a threaded knob is rotatably mounted on the dispenser housing structure and operatively engageable with said stem to effect linear adjustment of the gate portion of said valve in said housing relative to said outlet, indicia provided on said knob and said stem for the visual selection of a desired position of the metering opening relative to the discharge outlet and therefore the desired flow rate of material, and wherein open ended slots are provided in the sides of said gate portion to form yieldable wing members serving as said springs, the free ends of said wings being thickened for engagement with said shoulders to be pressed inwardly thereby.

* * * * *